US007397579B2

(12) United States Patent
Coburn

(10) Patent No.: US 7,397,579 B2
(45) Date of Patent: Jul. 8, 2008

(54) IN-LINE FABRIC LABELING PRINTING SYSTEM AND ASSOCIATED METHOD OF USE

(75) Inventor: Thayer A. Coburn, Whitewater, WI (US)

(73) Assignee: The Coburn Company, Inc., Whitewater, WI (US)

( * ) Notice: Subject to any disclaimer, the term of this patent is extended or adjusted under 35 U.S.C. 154(b) by 358 days.

(21) Appl. No.: 10/707,616

(22) Filed: Dec. 24, 2003

(65) Prior Publication Data

US 2005/0074588 A1 Apr. 7, 2005

Related U.S. Application Data

(60) Provisional application No. 60/481,457, filed on Oct. 1, 2003.

(51) Int. Cl.
*G06F 15/00* (2006.01)

(52) U.S. Cl. ...................... 358/1.18; 358/1.1; 358/1.13; 358/1.14; 358/1.15; 705/27; 707/2; 707/3; 707/102

(58) Field of Classification Search ................ 358/1.18, 358/1.13, 1.14, 1.1, 1.15; 705/27; 707/2, 707/3, 102
See application file for complete search history.

(56) References Cited

U.S. PATENT DOCUMENTS

| | | | | |
|---|---|---|---|---|
| 3,458,381 | A | 7/1969 | Metcalfe | |
| 5,501,902 | A | 3/1996 | Kronzer | |
| 5,585,156 | A * | 12/1996 | Fontana | 428/43 |
| 5,741,548 | A | 4/1998 | Sanduja et al. | |
| 5,756,692 | A | 5/1998 | Gregory et al. | |
| 5,854,148 | A | 12/1998 | Asada et al. | |
| 5,885,678 | A | 3/1999 | Malhotra | |
| 5,897,694 | A | 4/1999 | Woolf | |
| 6,001,137 | A | 12/1999 | Alfekri et al. | |
| 6,186,555 | B1 | 2/2001 | Rawlings | |
| 6,263,816 | B1 | 7/2001 | Codos et al. | |
| 6,277,229 | B1 | 8/2001 | Popat et al. | |
| 6,493,677 | B1 * | 12/2002 | von Rosen et al. | 705/27 |
| 2003/0118795 | A1 | 6/2003 | Wright et al. | |
| 2004/0138905 | A1 * | 7/2004 | Stinson et al. | 705/1 |
| 2005/0034241 | A1 * | 2/2005 | Prince et al. | 5/690 |
| 2005/0102151 | A1 * | 5/2005 | Fuwa et al. | 705/1 |

* cited by examiner

*Primary Examiner*—David K Moore
*Assistant Examiner*—Mark R Milia
(74) *Attorney, Agent, or Firm*—Husch Blackwell Sanders LLP

(57) ABSTRACT

A fabric label for a product, wherein at least the top side of the fabric label is conventionally printed with a printing press with general information that is applicable to a plurality of products and a toner jet receptive coating is located on at least a portion of the top side of the conventionally printed top side of the fabric label, wherein at least a portion of the toner receptive coating is printed with laser jet printing with specific product information, without any ink jet printing, to reduce smearing and improved print resolution. Also, a computer-readable medium for creating a product label is also disclosed with a first plurality of electronic files with each file having general product information and a second plurality of electronic files with each file directed to specific product information along with a process for electronically displaying the general and specific product information.

9 Claims, 28 Drawing Sheets

211

FIG. 8
View Document
Back to Main Menu
258
Click a format link below to view documents compatible with that format.
All Formats for homebase
SO COMFORTABLE,
YOU'LL FEEL THE DIFFERENCE
THE MOMENT YOU LIE DOWN.
Serta
BODY PILLOW
Gold Foil
262
Body Pillow (Example:7xxxxx)
263
260
Masterpiece
CLASSIC
264
Masterpiece Classic
265
Masterpiece
Solo
266
Masterpiece Solo
267

268

Masterpiece Tranquility 269

270

260

Masterpiece Visco-Elast 271

272

Nightstar Elite (Example:1xxxxx) 273

274

Perfect Night (Example:0xxxxx) ← 275

276

260

Private Sheep Label (CTL 1888) ← 277

278

Super Premium (Example:3xxxxx) ← 279

View Documents

Back to Main Menu

Click a document link below to view that document.

All Documents for homebase
for Format Super Premium (Example:3xxxxx)

Choose a Different Format

- 203231 Stonegate (Trad)
- 300031 Astor Supreme (Easy)
- 300031 Astor Supreme (Trad)
- 300041 Artist Park (Easy)
- 300041 Artist Park (Trad)
- 300051 Monaca Select (Easy)
- 300061 Asheville Select (Easy)
- 300062 Asheville Select PS (Easy)
- 300081 Berteau (Trad)
- 300111 Bermuda Supreme (Trad)
- 300131 Bonavista Isle (Easy)
- 300131 Bonavista Isle (Trad)
- 300141 Avondale Supreme (Trad)
- 300142 Avondale Supreme PS (Trad)
- 300171 Ashford Isle (Trad)
- 300172 Ashford Isle PS (Trad)
- 300231 Brandon Vista (Trad)
- 300241 Barrington Vista (Trad)
- 300261 Sedgewick (Trad)
- 300262 Grace PS (Trad)
- 300331 Campbell Park (Trad)
- 300341 Carlson Isle (Easy)
- 300341 Carlson Isle (Trad)
- 300361 Almdale Drive (Easy)
- 300361 Almdale Drive (Trad)
- 300381 Bayfield Supreme (Trad)
- 300431 Evandale Supreme (Trad)
- 300441 Chatsworth Supreme (Trad)
- 300451 Ardmore Isle (Easy)
- 300451 Ardmore Isle (Trad)
- 300461 Brighton Vista (Trad)
- 300471 Ferndale Supreme (Trad)
- 300481 Braxton Park (Trad)
- 300531 Flanders Vista (Trad)
- 300541 China Isle (Trad)
- 300551 Bellamy Vista (Trad)
- 300581 Bremerton Isle (Easy)
- 300631 Grand Confidant (Trad)
- 300631 Grand Confidant (Easy)
- 300633 Grand Confidant PT (Trad)
- 300641 Edgewater Vista (Trad)
- 300651 Cambridge Park (Easy)
- 300651 Cambridge Park (Trad)
- 300661 Calico Supreme (Trad)
- 300662 Calico Supreme PS (Trad)
- 300671 Glenrose Isle (Trad)
- 300681 Camry Park (Trad)
- 300681 Camry Park (Easy)
- 300731 Grand Freedom (Trad)
- 300741 Glencoe Park (Trad)
- 300751 Concord Supreme (Easy)
- 300751 Concord Supreme (Trad)
- 300761 Clarity Park (Easy)
- 300761 Clarity Park (Trad)
- 300771 Grand Brookdale (Trad)

280

FIG. 9

- 300772 Grand Brookdale PS (Trad)
- 300811 Graham Vista (Trad)
- 300831 Grand Vernay (Easy)
- 300831 Grand Vernay (Trad)
- 300841 Grand Bonneville (Easy ← 282
- 300841 Grand Bonneville (Trad)
- 300851 Covington Vista (Trad)
- 300861 Grand Brimley (Trad)
- 300871 Grand Glory (Trad)
- 300871 Grand Glory (Easy)
- 300872 Grand Glory PS (Trad)
- 300931 Magna Park (Easy)
- 300931 Magna Park (Trad)
- 300941 Grand Dovenby (Trad)
- 300951 Dorchester Isle (Easy)
- 300953 Exquisite Grand PT (Trad)
- 300961 Grand Canterbury (Trad)
- 300971 Grand Moonlight (Trad)
- 300981 Copperton Isle (Easy)
- 301031 Milford Isle (Trad)
- 301031 Milford Isle (Easy)
- 301033 Milford Isle PT (Trad)
- 301041 Grand Laredo (Trad)
- 301051 Electra Supreme (Trad)
- 301051 Electra Supreme (Easy)
- 301053 Grand Avanti PT (Trad)
- 301061 Grand Reflection (Trad)
- 301061 Grand Reflection (Easy)
- 301071 Grand Sonata (Easy)
- 301071 Grand Sonata (Trad)
- 301081 Fairfax Vista (Trad)
- 301131 Montclair Grand (Easy)
- 301131BL Montclair Grand (Trad)
- 301141 Grand Somerset (Trad)
- 301142 Grand Somerset PS (Trad)
- 301151 Exquisite Grand (Trad)
- 301161 Grand Summit (Easy)
- 301161 Grand Summit (Trad)
- 301171 Harrington Park (Trad)
- 301231 Pavillion Park (Easy)
- 301231 Pavillion Park (Trad)
- 301241 Heather Isle (Trad)
- 301241 Heather Isle (Easy)
- 301242 Heather Isle PS (Trad)
- 301251 Grand Avanti (Trad)
- 301261 Kenmore Vista (Easy)
- 301262 Kenmore Vista PS (Easy)
- 301271 Kentfield Park (Trad)
- 301272 Kentfield Park PS (Trad)
- 301281 Grand Accolade (Trad)
- 301331 Pembroke Vista (Trad)
- 301341 Landmark Vista (Easy)
- 301341 Landmark Vista (Trad)
- 301351 Grand Jamboree (Easy)
- 301351 Grand Jamboree (Trad)
- 301361 Madison Isle (Easy)
- 301361 Madison Isle (Trad)
- 301371 Langley Isle (Easy)
- 301431 Solana Supreme (Trad)
- 301433 Solana Supreme PT (Trad)
- 301441 Lexus Supreme (Trad)
- 301451 Grand Sensation (Easy)
- 301451 Grand Sensation (Trad)
- 301461 Mansion Supreme (Trad)
- 301471 Millbridge Supreme (Trad)
- 301472 Millbridge Supreme PS (Trad)

280

FIG. 9A

- 301531 Springmill Isle (Easy)
- 301531 Springmill Isle (Trad)
- 301541 Rainier Park (Trad)
- 301551 Highland Park (Trad)
- 301551 Highland Park (Easy)
- 301561 Milner Park (Easy)
- 301561 Milner Park (Trad)
- 301581 Grand Topaz (Trad)
- 301611 Northfield Vista (Trad)
- 301631 Tular Supreme (Easy)
- 301641 Silhoutte Park (Trad)
- 301641 Silhoutte Park (Easy)
- 301652 Newport Supreme PS (Trad)
- 301661 Nassau Isle (Easy)
- 301661 Nassau Isle (Trad)
- 301681 Jade Park (Easy)
- 301681 Jade Park (Trad)
- 301731 Wabash Vista (Trad)
- 301741 Silk Vista (Easy)
- 301741 Silk Vista (Trad)
- 301751 Lynwood Vista (Trad)
- 301761 Paragon Supreme (Easy)
- 301761 Paragon Supreme (Trad)
- 301771 Opal Supreme (Easy)
- 301771 Opal Supreme (Trad)
- 301772 Opal Supreme PS (Trad)
- 301781 Newton Vista (Easy)
- 301781 Newton Vista (Trad)
- 301831 Westwood Isle (Trad)
- 301831 Westwood Isle (Easy)
- 301841 Ultima Supreme (Easy)
- 301841 Ultima Supreme (Trad)
- 301851 Newport Supreme (Easy)
- 301851 Newport Supreme (Trad)
- 301861 Platinum Vista (Trad)
- 301871 Parliment Isle (Trad)
- 301881 Norwood Supreme (Trad)
- 301931 Wilshire Park (Easy)
- 301941 Waterford Park (Easy)
- 301941 Waterford Park (Trad)
- 301942 Waterford Park PS (Trad)
- 301961 Scarlet Isle (Trad)
- 301961 Scarlet Isle (Easy)
- 301971 Thurston Park (Easy)
- 302036 Ashbury ET (Trad)
- 302041 Bradford (Trad)
- 302051 Revere Isle (Easy)
- 302061 Seville Supreme (Trad)
- 302062 Seville Supreme PS (Trad)
- 302071 Extra Southgate (Trad)
- 302072 Silver Premier PS (Easy)
- 302081 Willow Isle (Trad)
- 302081 Willow Isle (Easy)
- 302136 Vienna Eurotop (Trad)
- 302151 Southampton Vista (Trad)
- 302161 Sommerville Park (Easy)
- 302161 Sommerville Park (Trad)
- 302171 Southgate (Trad)
- 302181 Brookport (Trad)
- 302231 Garnett (Trad)
- 302241 Chapman (Trad)
- 302251 Squire Park (Easy)
- 302251 Squire Park (Trad)
- 302253 Lasalle PT (Trad)
- 302261 Stratton Vista (Trad)
- 302263 Midway PT (Trad)

280

FIG. 9B

- 302272 Fairfield PS (Trad)
- 302281 Braeburn (Trad)
- 302341 Greenway (Trad)
- 302343 Colton Creek PT (Trad)
- 302351 Viewpoint Supreme (Trad)
- 302352 Woodlawn PS (Trad)
- 302361 Extra Whitehall (Trad)
- 302362 Hillcrest PS (Trad)
- 302363 Delray Elite PT (Trad)
- 302371 Berryessa (Trad)
- 302372 Ocala Supreme PS (Trad)
- 302461 Whitehall (Trad)
- 302462 Augusta PS (Trad)
- 302471 Silver Premier (Easy)
- 302471 Silver Premier (Trad)
- 302541 Meadowlark (Trad)
- 302542 Bradshaw Comfort PS (Trad)
- 302551 Woodlawn (Trad)
- 302561 Extra Meridian (Trad)
- 302562 Extra Whitehall PS (Trad)
- 302571 Loomis (Trad)
- 302581 Edgartown (Trad)
- 302651 Special Anniversary (Easy)
- 302651 Special Anniversary (Trad)
- 302661 Meridian (Trad)
- 302662 Whitehall PS (Trad)
- 302681 Alma (Trad)
- 302741 Bradshaw Comfort (Trad)
- 302751 Hudson (Trad)
- 302762 Extra Meridian PS (Trad)
- 302771 Matteson (Trad)
- 302781 Colony (Trad)
- 302831 Pleasant Hill Limited (Trad)
- 302833 Orchard Brook PT (Trad)
- 302853 San Leandro PT (Trad)
- 302861 Augusta (Trad)
- 302862 Meridian PS (Trad)
- 302871 Ocala Supreme (Trad)
- 302872 Just For Kids PS (Trad)
- 302881 Daytona (Trad)
- 302931 Ashbury (Trad)
- 302941 Westview (Trad)
- 302953 Birchdale Supreme PT (Trad)
- 302971 Fairfield (Trad)
- 302981 Teak (Easy)
- 302981 Teak (Trad)
- 303031 Orchard Brook (Trad)
- 303041 Burgundy (Trad)
- 303051 San Leandro (Trad)
- 303052 Lamar PS (Easy)
- 303141 Magellan (Trad)
- 303142 Roswell PS (Easy)
- 303151 Birchdale Supreme (Easy)
- 303151 Birchdale Supreme (Trad)
- 303152 Willow Harbor PS (Trad)
- 303161 Alhambra (Trad)
- 303171 Tilden (Trad)
- 303241 Roswell (Easy)
- 303243 Fresno PT (Easy)
- 303252 Tulare 1 PS (Trad)
- 303263 Pendleton PT (Trad)
- 303341 Fresno (Easy)
- 303351 Terra Limited (Trad)
- 303352 Magnolia PS (Trad)
- 303353 Lamar PT (Easy)
- 303361 Gabrielle (Trad)

280

FIG. 9C

284

Featuring patented
Comfort Quilt®

GRAND BONNEVILLE easycare

300841

FIG. 10

294

Featuring patented
Comfort Quilt®

VISBY
with Visco-Elastic Foam

Traditional
TWO-SIDED COMFORT

780031

FIG. 12

IN-LINE FABRIC LABELING PRINTING SYSTEM AND ASSOCIATED METHOD OF USE

CROSS REFERENCE TO RELATED APPLICATIONS

This patent application claims priority to U.S. Provisional Patent Application Ser. No. 60/481,457 filed Oct. 1, 2003.

BACKGROUND OF INVENTION

Currently, when licensees or subsuppliers need product labels made of fabric, they make a request to the supplier who produces the labels in large batches. These large batches must be scheduled for printing and then finally shipped to the licensee or subsupplier. Finally, the labels are then attached to the products. A nonlimiting example includes the manufacturing of finished mattress labels in large quantities, which are then, upon request, sent to the licensee. The licensee then sews the labels onto the mattresses. The production of large quantities of product labels is very time consuming, costly and provides very little flexibility. It is not cost-effective for the supplier to print the product labels in anything but large quantities since there are set-up costs involved for each printing production run. Therefore, most of the product labels may stay on a shelf for a long period of time. In some instances, the labels eventually become damaged or outdated and have to be thrown away. Moreover, the licensee or subsupplier must pay for storage of the product labels before they can be put into production. These labels must be protected from theft and damage with associated insurance expenses. Also, special order products and experimental products will create significant problems. They require coordination with the supplier's label production facility with time delays due to the scheduling conflicts with pre-existing orders for product labels. The supplier will require a minimum quantity so that if the marketing test for the experimental product is unsuccessful, a significant amount of product labels will have to be discarded. A small special order will intrinsically result in the destruction of numerous product labels.

Also, most product labels have general information that appears on a wide variety of products and specific product information that only specific customers, e.g., subsuppliers, franchisees, need to utilize since they are only selling those particular models under the general product line. For example, with mattress labels, there are label imprint backgrounds that typically includes manufacturer's trademarks and other general information that can be applied to a number of specific mattress models. In addition, there is specific information that can only be used on one particular model of mattress.

In the description of flowcharts, the functional explanation marked with numerals in angle brackets, <nnn>, will refer to the flowchart blocks bearing that number. Referring now to FIG. 3, the prior art method of obtaining product labels using fabric is generally indicated by numeral 2. The first step in the process is for the user, e.g., customer, to recognize a need for fabric product labels <10>. The second step is a query as to whether there is a need for a significant quantity of labels, e.g., one hundred (100) <12>. If the response to this query is negative, the process is over <14>. If the quantity is over the predetermined minimum, the next step is for the customer to place the order <16>. The labels are then printed on fabric stock <18>. The labels are then sent to the customer and sewn into the respective products <20>. This is the end of the process <22>. A major drawback to this process is that a predetermined quantity, e.g., one hundred (100) has to be printed to be cost-effective. These labels had to be stored at a significant cost and could become damaged or obsolete before ever being used. This printing is typically performed on large-scale printing presses, e.g., Heidelberg presses, with all of the associated set-up, operational and maintenance costs associated therewith. This conventional printing operation is generally indicated by numeral 500 in FIG. 19.

One prior attempt to overcome some of these problems was the use of an ink jet printer to print the specific information on the product label by the customers, e.g., subsuppliers, franchisees, after the general information has been printed elsewhere by the supplier. There are numerous deficiencies associated with the use of ink jet printers. The first is that the ink used with ink jet printing is water-soluble and will bleed upon contact with fabric from a label. Upon drying, the printed ink will easily smear upon physical interaction, e.g., rubbing. An example of this is shown by the mattress label provided in FIG. 1. Moreover, the resolution for ink jet printing is relatively poor. An example of this is shown by the mattress label provided in FIG. 2 with written material under the EASY CARE™ trademark, as indicated by numeral 3. Moreover, the ink utilized in ink jet printing can fade as well as run under bright lights.

Ink jet printing on fabric product labels is disclosed in U.S. patent application Ser. No. 2003/0118795 that was published on Jul. 26, 2003. This published U.S. patent application recites: "Also, while ink jet printing is the preferred embodiment because the label stock adsorbs much of the ink, thereby providing greater crock resistance, laser printing of the label could be used for articles where very high crock resistance is not needed." (Paragraph 0031, Lines 6-8). Therefore, this published patent application specifically teaches away from the use of laser jet printing for mattress labels since this published patent application was specifically directed to the printing of mattress labels and only claimed and described ink jet printing due to this crocking issue. Moreover, this published patent application only discloses the use of an ink jet receptive coating, which is markedly different than laser jet receptive coating or copier receptive coating, which is collectively known as "toner receptive coating."

The present invention is directed to overcoming one or more of the problems set forth above.

SUMMARY OF INVENTION

In one aspect of this invention, a fabric label for a mattress is disclosed. This includes a fabric label, having a top side and a bottom side, wherein at least the top side of the fabric label is conventionally printed with a printing press with general information that is applicable to a plurality of mattress products and wherein the fabric label includes a region that is printed by laser jet printing with specific information that is directed to a single mattress product without any ink jet printing.

In another aspect of this invention, a fabric label for a product is disclosed. This includes a fabric label, having a top side and a bottom side, wherein at least the top side of the fabric label is conventionally printed with a printing press with general information that is applicable to a plurality of products and a toner jet receptive coating is located on at least a portion of the top of the conventionally printed top side of the fabric label, wherein at least a portion of the toner receptive coating is printed with laser jet printing with specific product information, without any ink jet printing, to reduce smearing and improve print resolution without a presence of an ink jet receptive coating.

In yet another aspect of this invention, a process for creating a label for a product utilizing a computer system is disclosed. The process includes selecting information for a fabric label, having a top side and a bottom side, from a computer database wherein at least the top side of the fabric label includes general product information that is applicable to a plurality of products, selecting specific product information that is directed to a single product from the database that can be utilized with the selected fabric label, loading the selected fabric label into a laser jet printer, wherein the selected fabric label has been printed by a printing press with the previously selected general product information that is applicable to a plurality of products and at least a portion of the top side of the selected fabric label includes a toner receptive coating, and printing the specific product information that is directed to a single product onto at least a portion of the toner receptive coating for the top side of the fabric label with the laser jet printer.

In still another aspect of this invention, a process for creating a fabric label for a mattress utilizing a computer system is disclosed. The process includes selecting information for a mattress fabric label, having a top side and a bottom side, from a computer database wherein at least the top side of the mattress fabric label includes general information that is applicable to a plurality of mattresses, selecting specific mattress information that is directed to a single mattress from the database that can be utilized with the selected mattress fabric label, loading the selected mattress fabric label into a laser jet printer, wherein the selected mattress fabric label has been printed by a printing press with the previously selected general information that is applicable to a plurality of mattresses, and printing the specific information that is directed to a single mattress onto at least a portion of the top side of the mattress fabric label with the laser jet printer.

In another aspect of this invention, a computer-readable medium containing a data structure for creating a label for a product utilizing a computer system is disclosed. The computer-readable medium includes a first plurality of electronic files with each file having general product information that is applicable to a plurality of products and each electronic file of the first plurality of electronic files replicates the general product information that is conventionally printed with a printing press on at least one fabric label, and a second plurality of electronic files with each file directed to specific product information and each electronic file of the second plurality of electronic files replicates the specific product information that is laser jet printed on the at least one fabric label having a toner receptive coating.

In yet another aspect of this invention, a process in a computer system for displaying and printing a product label is disclosed. The process includes displaying a plurality of fabric labels having general product information that is applicable to a plurality of products on at least one electronic display, selecting one fabric label, having a top side and a bottom side, from the plurality of previously displayed fabric labels, displaying a plurality of specific product information that is directed to a single product for the selected fabric label on the at least one electronic display, loading a fabric label into a laser jet printer, wherein the fabric label has been printed by a printing press with the previously selected general product information that is applicable to a plurality of products on the top side and at least a portion of the top side of the selected fabric label has a toner receptive coating, and printing the specific product information that is directed to a single product onto at least a portion of the toner receptive coating for the selected fabric label with the laser jet printer.

In another aspect of this invention, a process in a computer system for remotely displaying and printing a product label is disclosed. The process includes accessing a first plurality of electronic files through a global computer network, at a first location, with each electronic file having general product information that is applicable to a plurality of products that is capable of being conventionally printed on a fabric label with a printing press at a second location, accessing a second plurality of electronic files through a global computer network, at the first location, with each file directed to specific product information, loading a fabric label, having a top side and a bottom side, into a laser jet printer at the first location, wherein the fabric label has been printed by a printing press with the previously selected general product information that is applicable to a plurality of products and at least a portion of the top side selected fabric label has a toner receptive coating, and printing the specific product information that is directed to a single product onto at least a portion of the toner receptive coating for the selected fabric label with the laser jet printer, at the first location.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which:

FIGS. 9, 9A, 9B, 9C and 9D are an exemplary screen display (graphical user interface for viewing a first illustrative, but nonlimiting, listing all of the specific product information files available for a one particular imprinted fabric product label, shown in FIG. 8B, in accordance with the present invention;

FIG. 10 is the graphical information for one specific product available for laser jet printing that was selected from the first illustrative listing shown in FIGS. 9, 9A, 9B, 9C and 9D in accordance with the present invention;

FIG. 12 is the graphical information for one specific product available for laser jet printing that was selected from the first illustrative listing shown in FIG. 11 in accordance with the present invention;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as to obscure the present invention. For example, the invention can be applied to virtually any type of product that utilized printed fabric. Although the preferred application involves the printing of a label for a mattress, a wide variety of fabric label printing applications can benefit from this Invention.

The preferred method of communication for this Invention is through a global computer network, e.g., Internet. However, there are numerous mechanisms for electronic communication that might suffice for this present invention. The database referred to in this Application can be associated with a single processor or a whole series of processors. In the description of flowcharts, the functional explanation marked with numerals in angle brackets, <nnn>, will refer to the flowchart blocks bearing that number.

Figure 1:
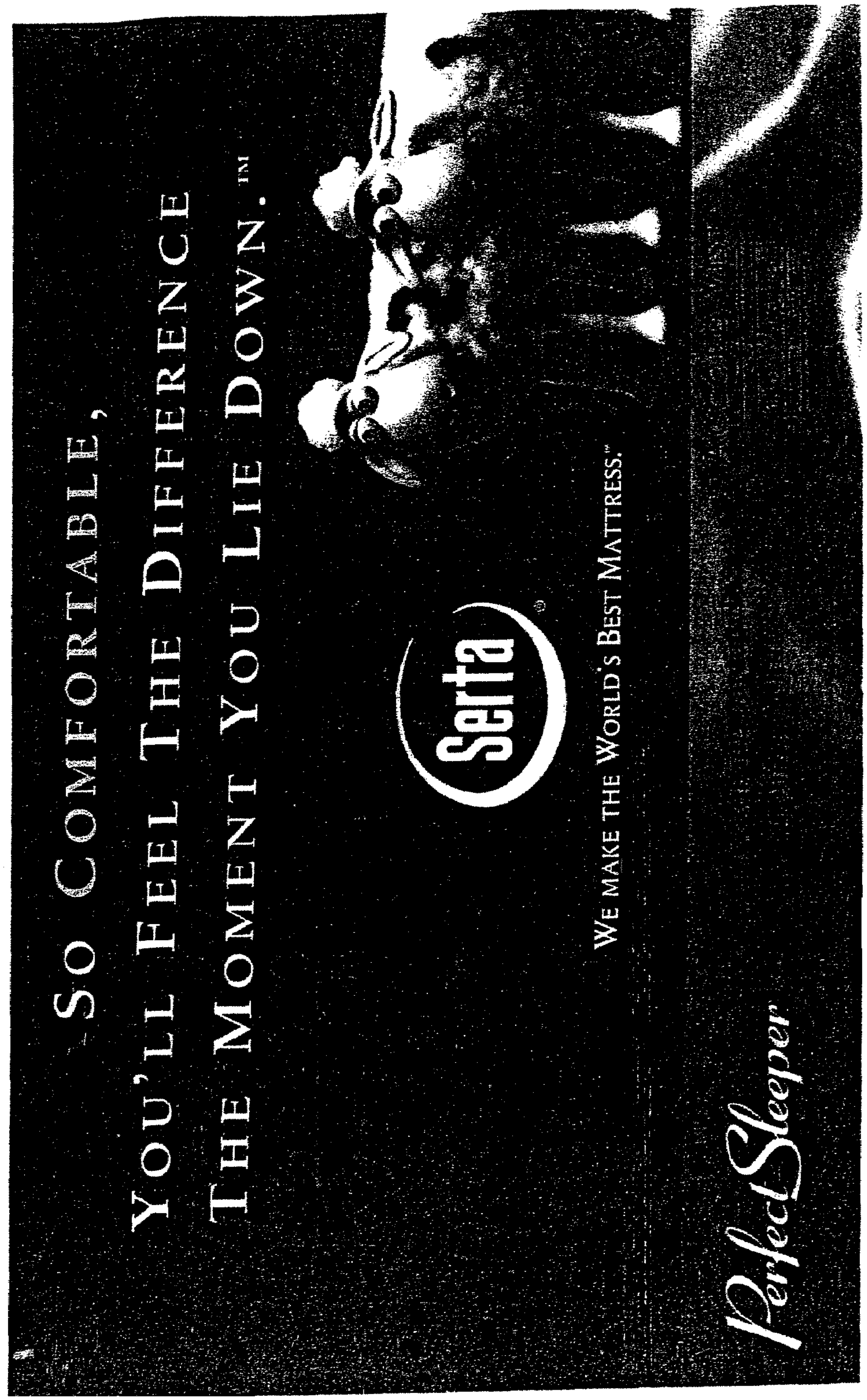
PRIOR ART FIG. 1
FIG. 1 is a perspective view of a prior art fabric product label, e.g., mattress label, illustrating ink jet printing and the problem of smearing.
Figure 2:
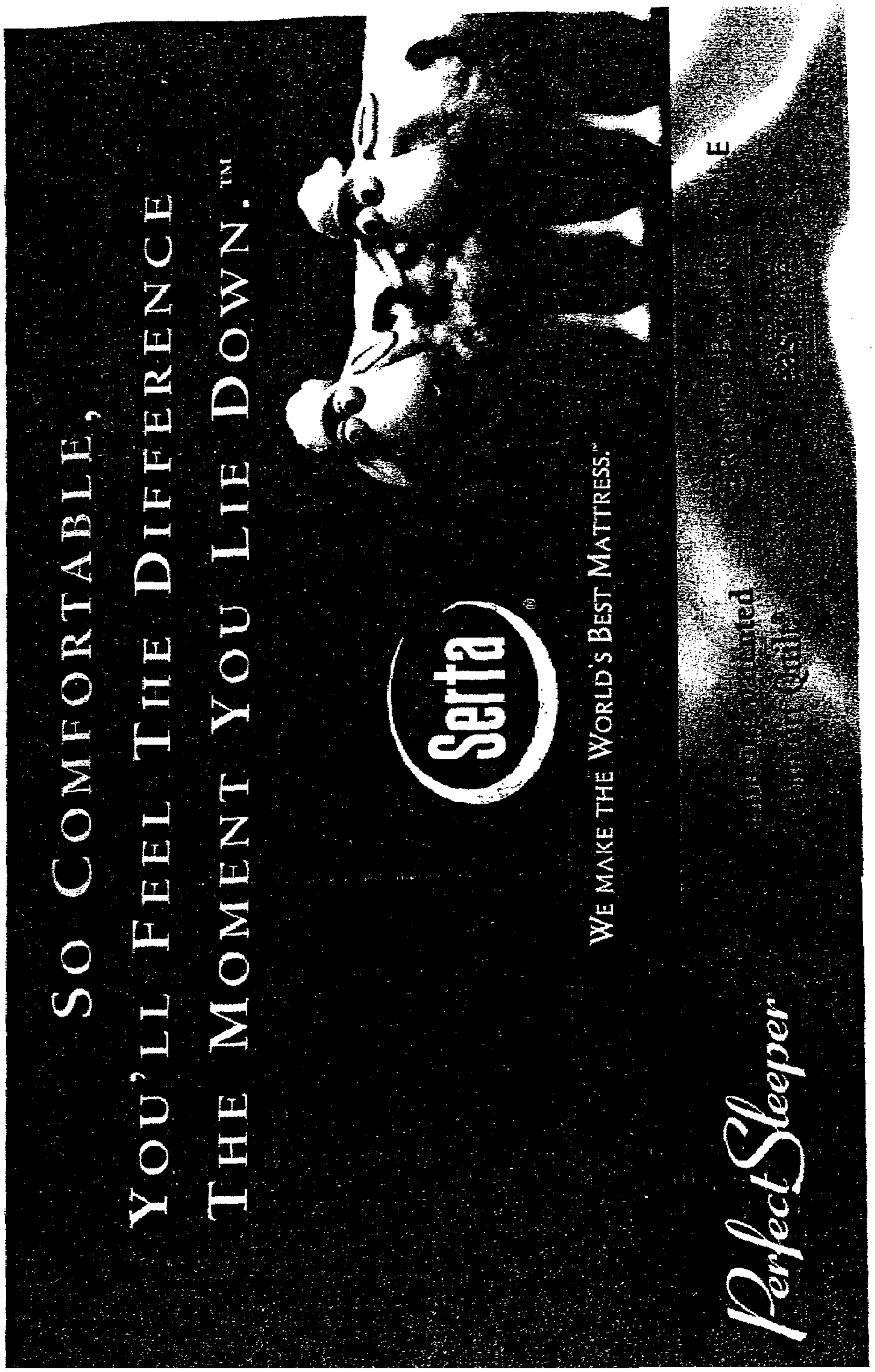
PRIOR ART FIG. 2
FIG. 2 is a perspective view of a prior art fabric product label, e.g., mattress label, illustrating ink jet printing and the problem of poor resolution.
Figure 3:
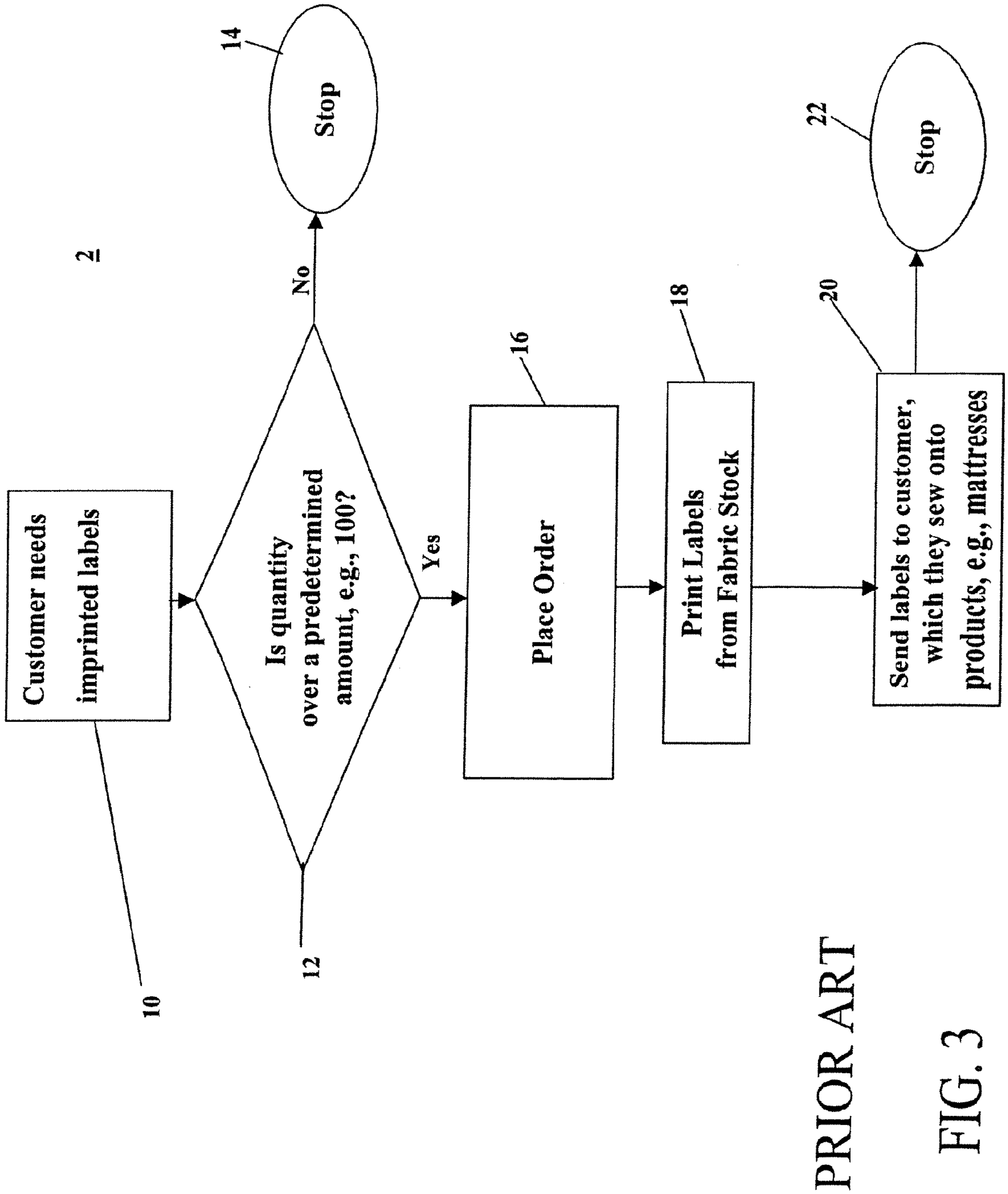
PRIOR ART FIG. 3
FIG. 3 is a flowchart of the prior art process of printing large batches of fabric product labels using conventional printing technology, e.g., Heidelberg printing presses.
Figure 4:
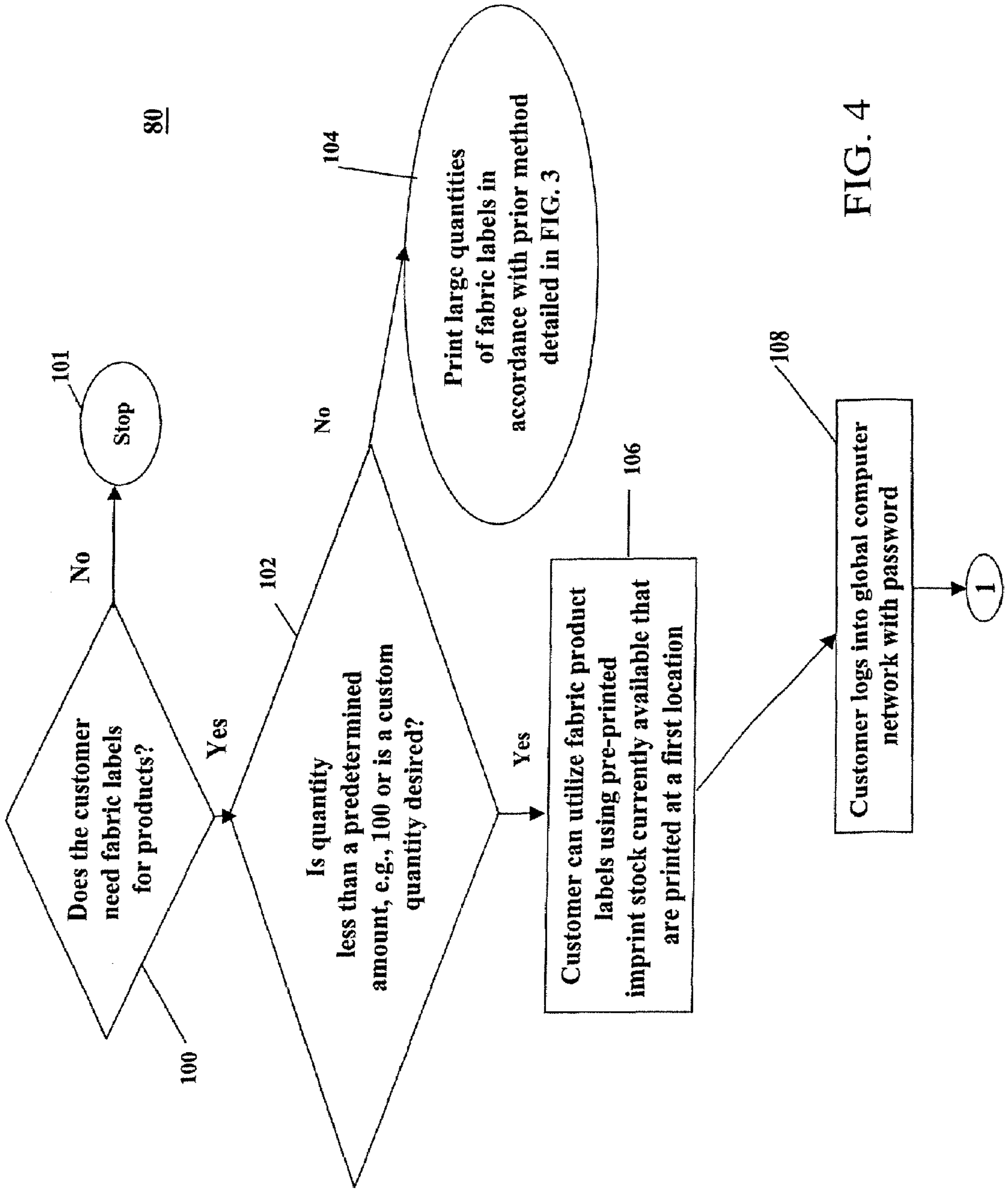
FIGS. 4, 4A and 4B are a flowchart of the process for printing product information on previously imprinted fabric product labels in accordance with the present invention.
Figure 4A:
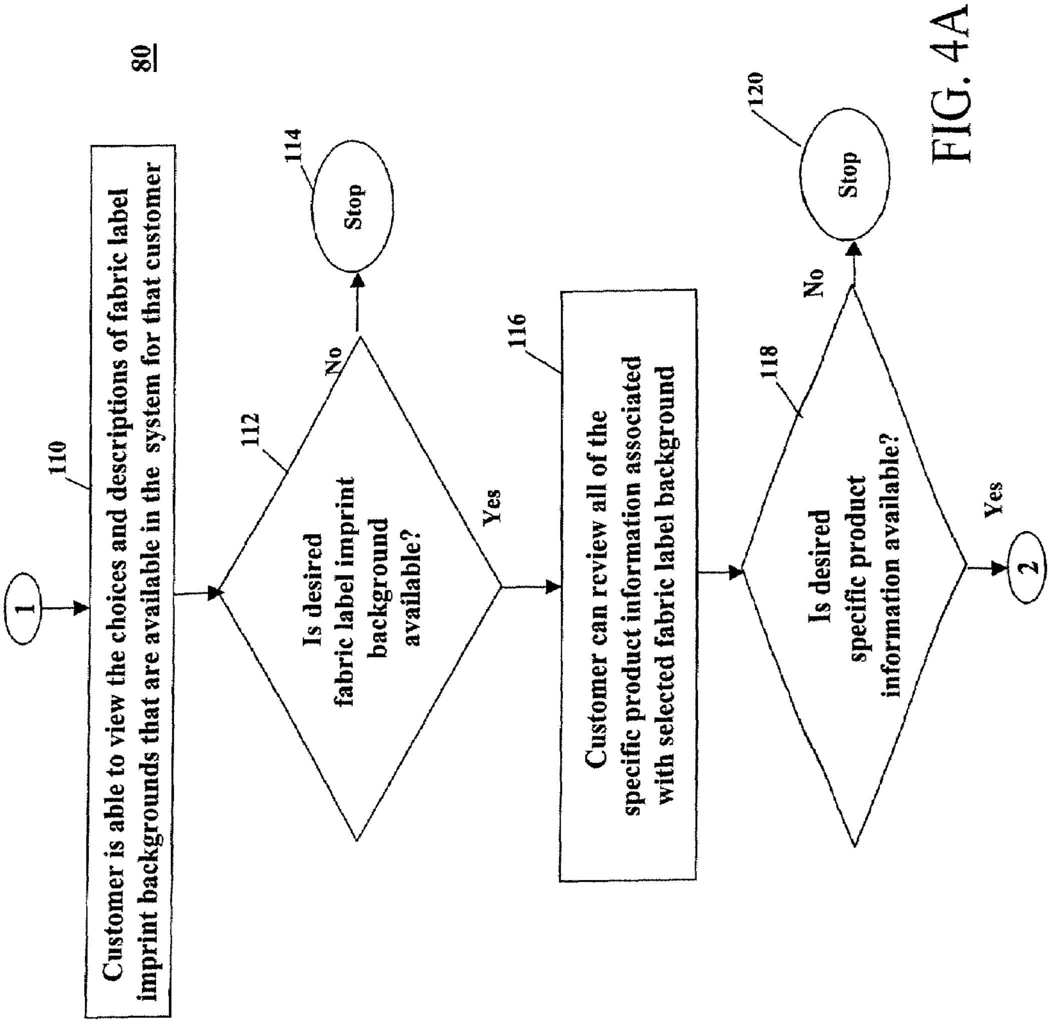
Figure 4B:
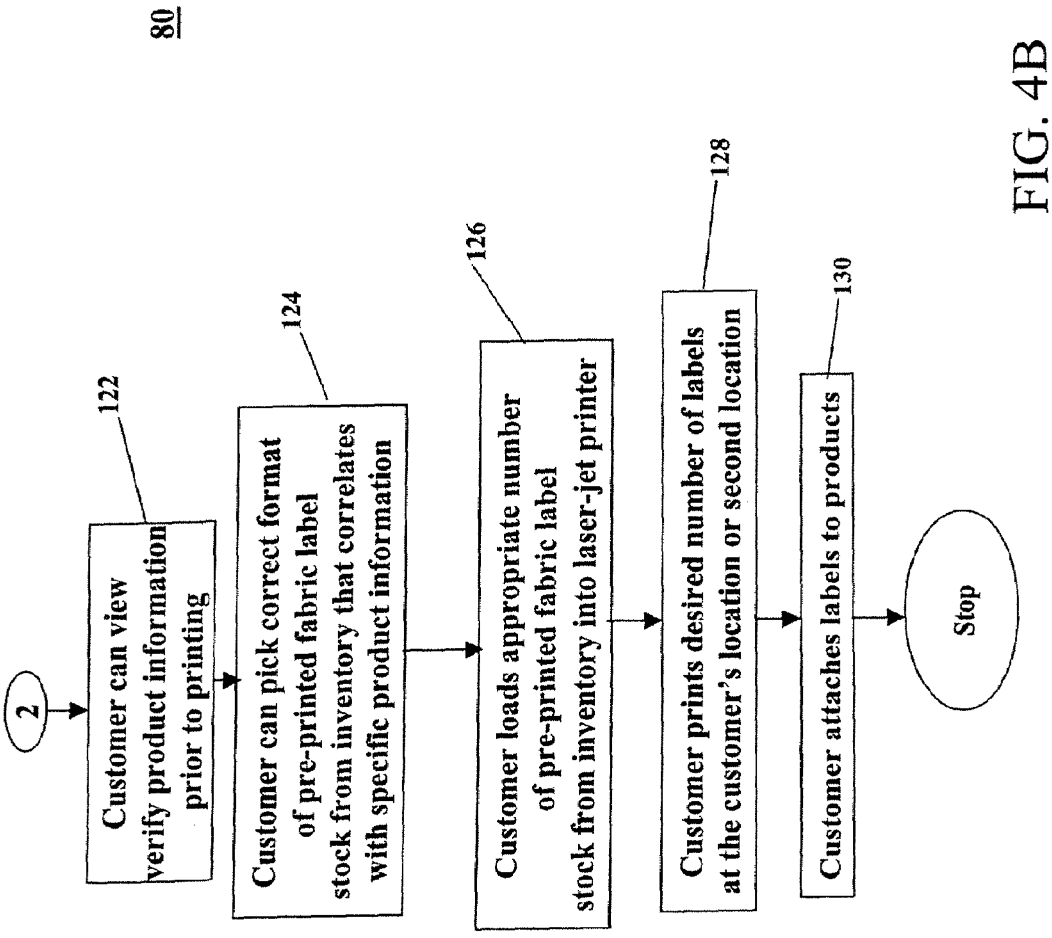

Referring now to the drawings, and initially to FIGS. 4, 4A and 4B, the flowchart of the present invention is generally indicated by numeral 80. The first step is for the customer to ascertain whether or not fabric labels for products are needed <100>. If the answer to this query is negative, then the process will not proceed <101>. If the answer to this query is positive, the next step is to determine if the quantity of fabric labels is less than a predetermined amount, e.g., one hundred (100), or if this is a custom batch of products or special order of products <102>. If the answer to this query is negative, the large scale printing of the fabric labels takes place at the factory in accordance with the process detailed above in FIG. 3 <104>. If the response to this query is positive, then the customer will utilize imprinted fabric labels that are currently available that do not provide specific product information or indicia <106>. These fabric labels are typically created at a first location, e.g., factory, and then sent to the customer. An example of an imprinted fabric label that does not have specific product information or indicia is generally indicted by numeral 300 on FIG. 17.

For conventional printing, due to the significant cost of set-up, large batches of product labels must be printed to be cost effective. A label includes the general product information that appears on a wide variety of products. In addition, there is specific product information that only specific customers, e.g., subsuppliers, franchisees, need to utilize since they are only selling those particular models under the general product line. For example, with mattress labels, there are label imprint backgrounds that typically includes manufacturer's trademarks and other general information that can be applied to a number of specific mattress models as indicated by numeral 300 in FIG. 17. In addition, there is specific information as indicated by numeral 301 in FIG. 18, which can only be used on one particular model of mattress. There is a significant need to allow the customer, e.g., subsuppliers, franchisees, to print the specific information on fabric labels that already have the general information conventionally printed thereon.

Figure 16:
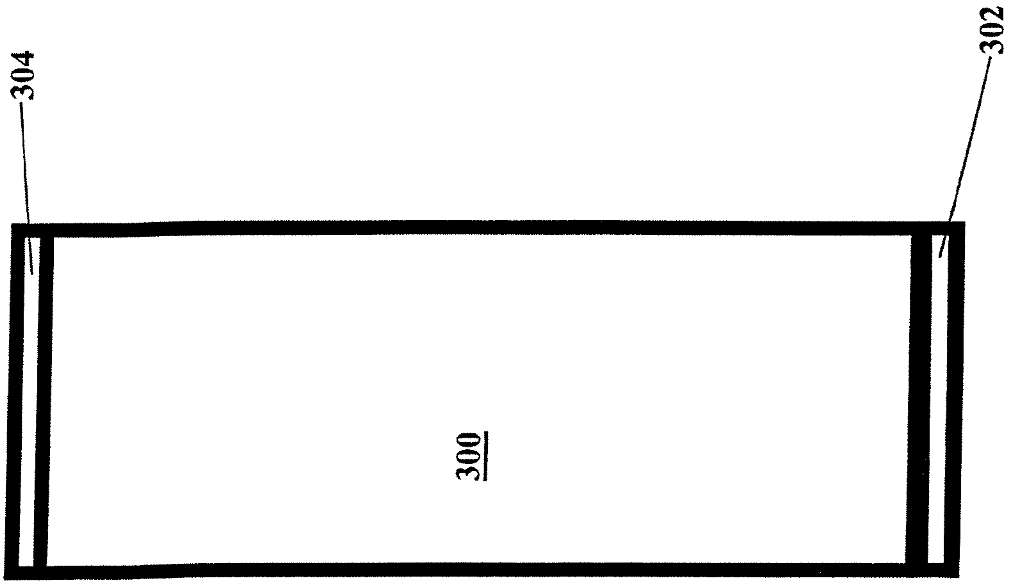
FIG. 16 is a side elevational schematic view of a fabric product label having a resilient coating on the bottom side (second side) and a toner receptive coating on at least a portion of the top side (first side) of the fabric product label in accordance with the present invention.

Referring now to FIG. 16, preferably there will be a laser jet receptive coating or copier receptive coating, which are collectively referred to throughout the present patent application as "toner receptive coating." Toner receptive coating 304 is located on the first or top side of the imprinted fabric label 300. Also, preferably there is a resilient coating, e.g., rubber, 302 on the bottom side or back side of the imprinted fabric label 300.

There is a marked difference between toner receptive coatings and ink jet receptive coatings. The toner used in laser jets is a fine black powder that is melted and fuses with the fabric in the imprinted fabric label 300. Copiers and laser printers utilize toners that contain various formulations of carbon black, a black, amorphous carbon pigment produced by the thermal decomposition of natural hydrocarbons. Carbon black may also be known as furnace black, acetylene black or thermal black. The toner receptive coating 304 is preferred to prevent smearing. There does not appear to be any issue regarding crocking of the imprinted fabric label 300 when utilizing laser printing and the previously described deficiencies associated with ink jet printing are overcome. There are a number of suppliers that can provide laser jet receptive coatings. Illustrative, but nonlimiting, examples include: Middlesex Research Mfg., Co., Inc. having a place of business at 27 Apsley Street, P.O. Box 444, Hudson, Mass. 01749;

Rayven Inc. having a place of business at 431 Griggs Street N, St. Paul, Minn. 55104; and Precision Coatings, Inc., having a place of business at 8120 Goldie Street, Walled Lake, Minn. 48390. A wide variety of fabrics can suffice for the imprinted fabric label 300 with the preferred fabric for mattresses being polyester fabric that is preferably, but not necessarily, woven polyester fabric. Preferably, the fabric label is previously dyed a single solid color prior to the conventional printing. The optimal single solid color is white.

Figure 5:
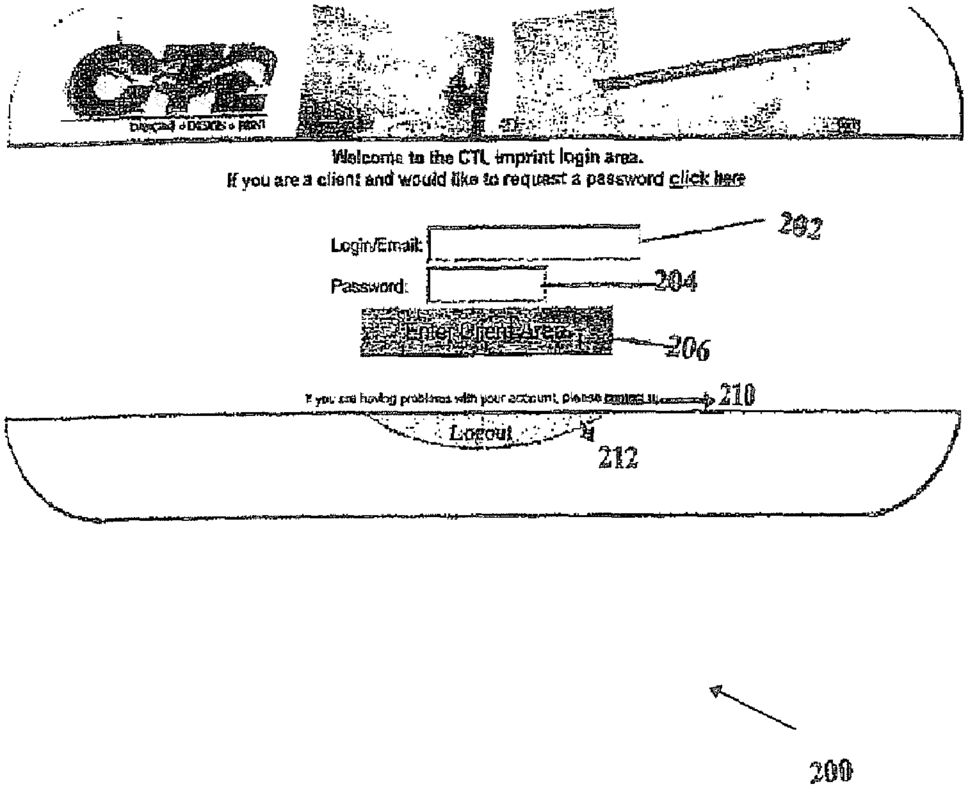
FIG. 5 is an exemplary screen display (graphical user interface) for providing access, e.g., a log-in and password, to a computer system of the present invention.

Referring again to FIG. 4, after the customer determines that he or she will utilize imprinted fabric labels that are currently available that do not provide specific product indicia, then the next step is to log into a global computer network, e.g., internet, to access the system associated with the present invention <108>. Referring now to FIG. 5, this takes the customer to the graphical user interface screen that is generally indicated by numeral 200. There is an input for login/e-mail indicated by numeral 202 and an input for a password indicated by numeral 204. There is a graphical user interface pushbutton that the customer then clicks-on to enter the inputted information into the system 206. There is a link 210 to contact or communicate with the system and a log-out function 212.

Figure 6:
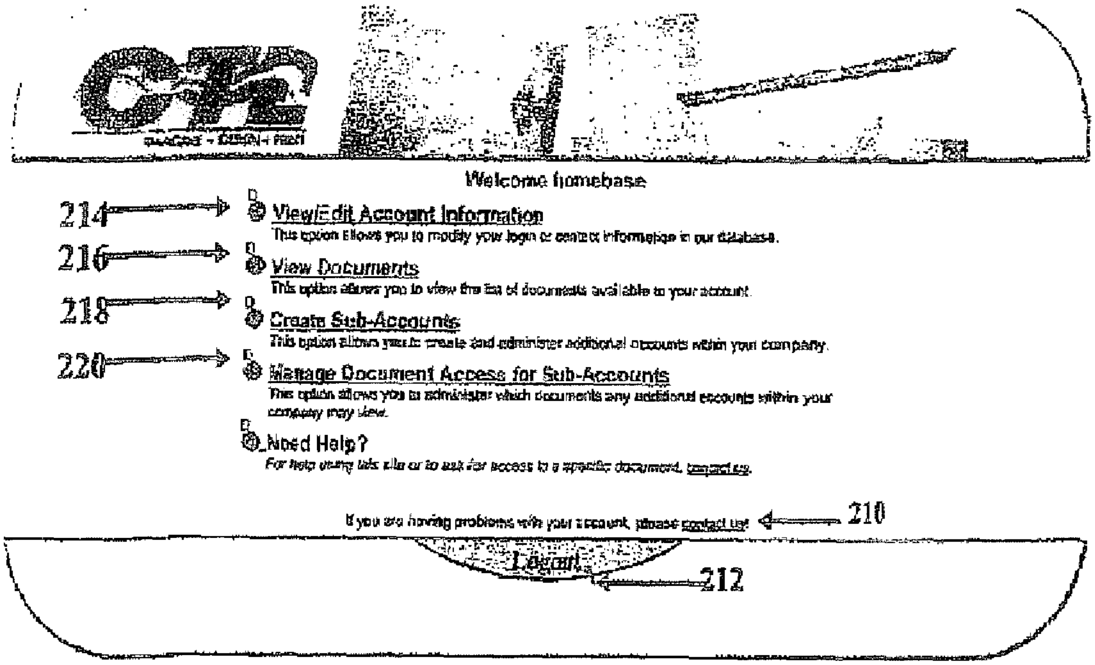
FIG. 6 is an exemplary screen display (graphical user interface) for providing a main home page with links to all main functions in accordance with the present invention.
Figure 7:
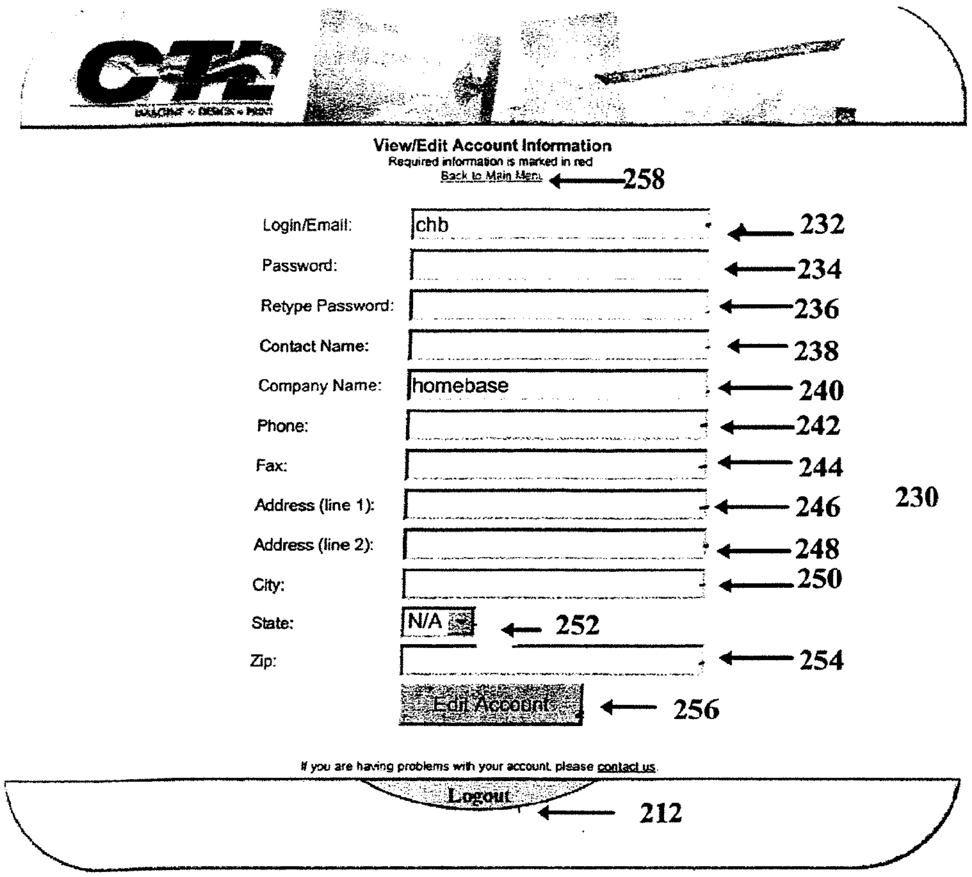
FIG. 7 is an exemplary screen display (graphical user interface) for viewing and editing account information for a person or entity that has access to the fabric label computerized laser jet printing system in accordance with the present invention.

Referring now to FIG. 6, the main home page of the system of the present invention is generally indicated by numeral 211. There is a first function 214 that allows the customer to view and edit account information 214. This directs the customer to the graphical user interface screen for viewing and updating account information that is generally indicated by numeral 230, as shown in FIG. 7. This includes: an input for a login or e-mail address 232; an input for a password 234; an input for a password verification 236; an input for a contact name 238; an input for the name of an organization 240; an input for a telephone number 242; an input for a facsimile number 244; an input for a first address line 246; an input for a second address line 248; an input for a city 250; a drop-down input for a state 252; and an input for a zip code 254. There is a graphical user pushbutton 256 that allows the customer to edit the account information. Finally, there is a link 258 that allows the customer to return to the home page of FIG. 6.

Referring again to FIG. 6, the second function 216 allows the customer to view all of the fabric label imprint backgrounds that typically includes manufacturer's trademarks and other general information that can be applied to a plurality of products but excludes the specific product information, which is also indicated by process step <110> as shown in FIG. 4A. Upon activation of this second function 216, the customer is directed to the graphical user interface screen shown on FIGS. 8, 8A, 8B, and 8C that is generally indicated by numeral 260. Each of the illustrative, but nonlimiting, examples of fabric label imprint backgrounds are indicated by numerals 262, 264, 266, 268, 270, 272, 274, 276, 278 and 280. Underneath each of the fabric label imprint backgrounds is a hyperlink that directs the customer to the selection of product specific information that is available for laser printing. In this specific, but nonlimiting example, fabric label imprint backgrounds 262, 264, 266, 268, 270, 272, 274, 276, 278 and 280 have corresponding hyperlink numerals 263, 265, 267, 269, 271, 273, 275, 277, 279 and 281, respectively.

The next step in the process is that the customer will determine if the desired fabric label imprint background is available <112>. If the desired fabric label imprint background is not available, the process stops <114>and if it is available, the customer can review all the product information that can be printed on the selected desired fabric label imprint background <116>. A determination can then be made if the specific product information is available <118>. If the desired product information is not available, the process is stopped <120>. If the desired product information is available, the specific information that will be printed on the desired fabric label imprint background can be reviewed <122>, as shown in FIG. 4B.

Figure 8:
FIGS. 8, 8A, 8B and 8C are an exemplary screen display (graphical user interface) for viewing illustrative, but non-limiting, imprinted fabric product labels available in the system with the general information that applies to a plurality of specific products printed thereon in accordance with the present invention.
Figure 8A:
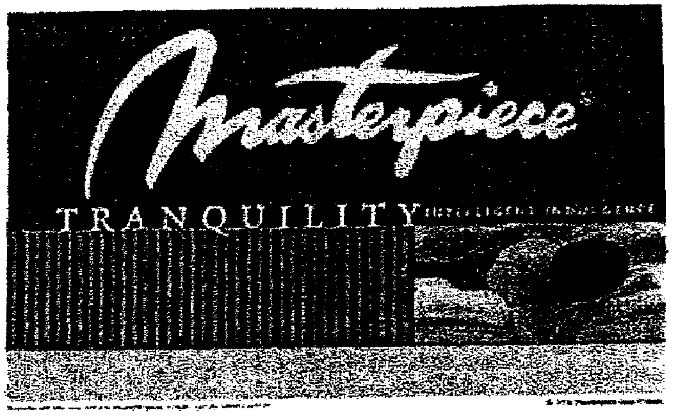
Figure 8A:
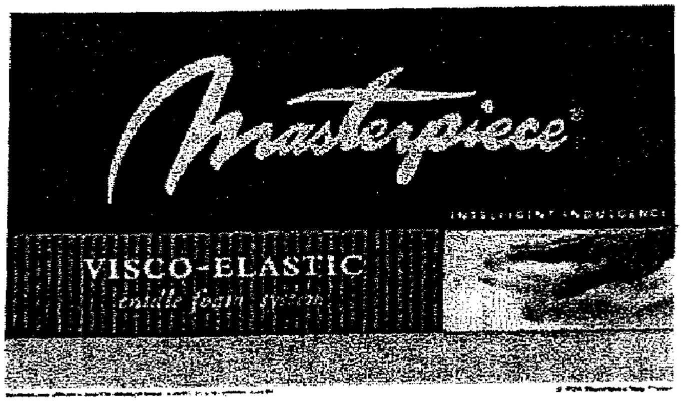
Figure 8A:
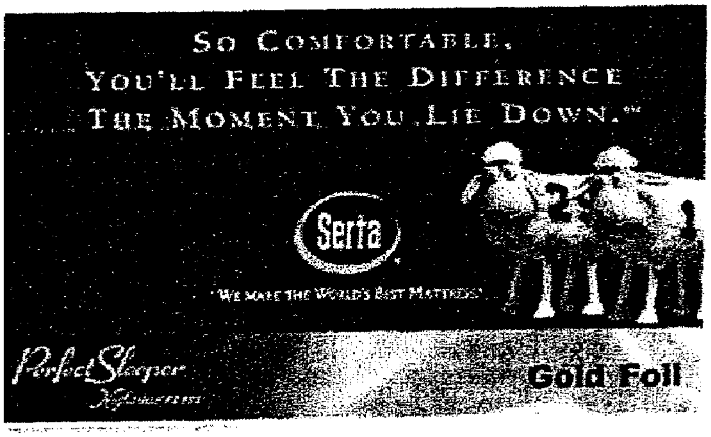
Figure 8B:
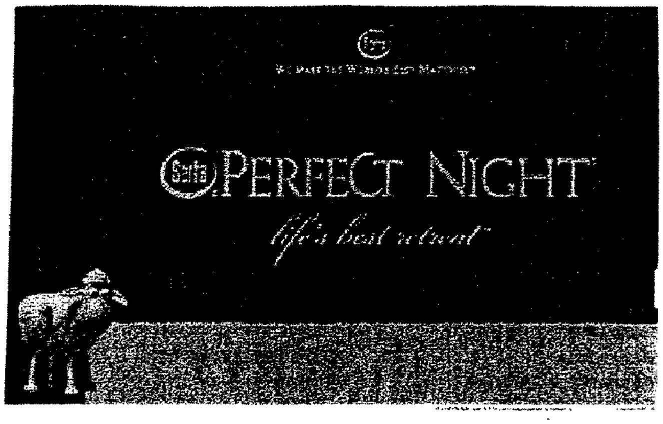
Figure 8B:
Figure 8B:
Figure 8C:
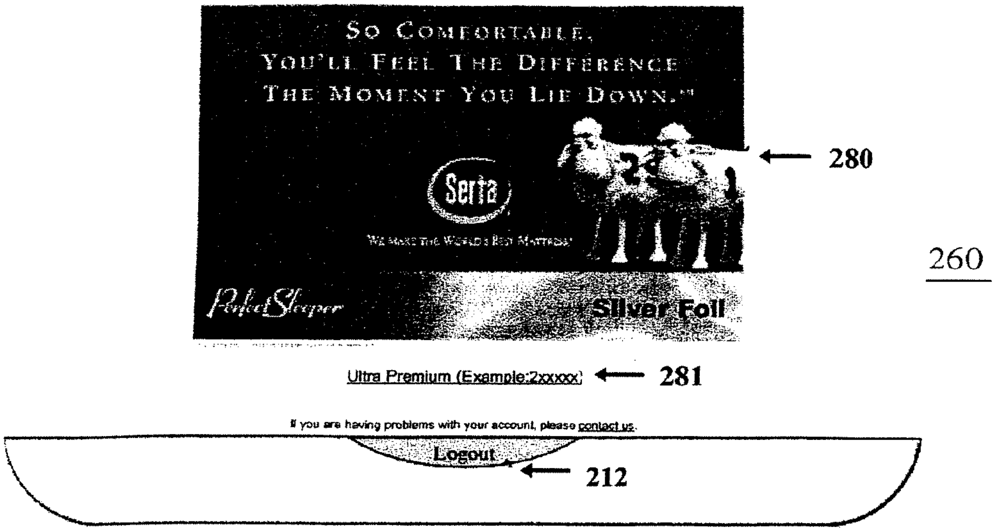
Figure 9D:
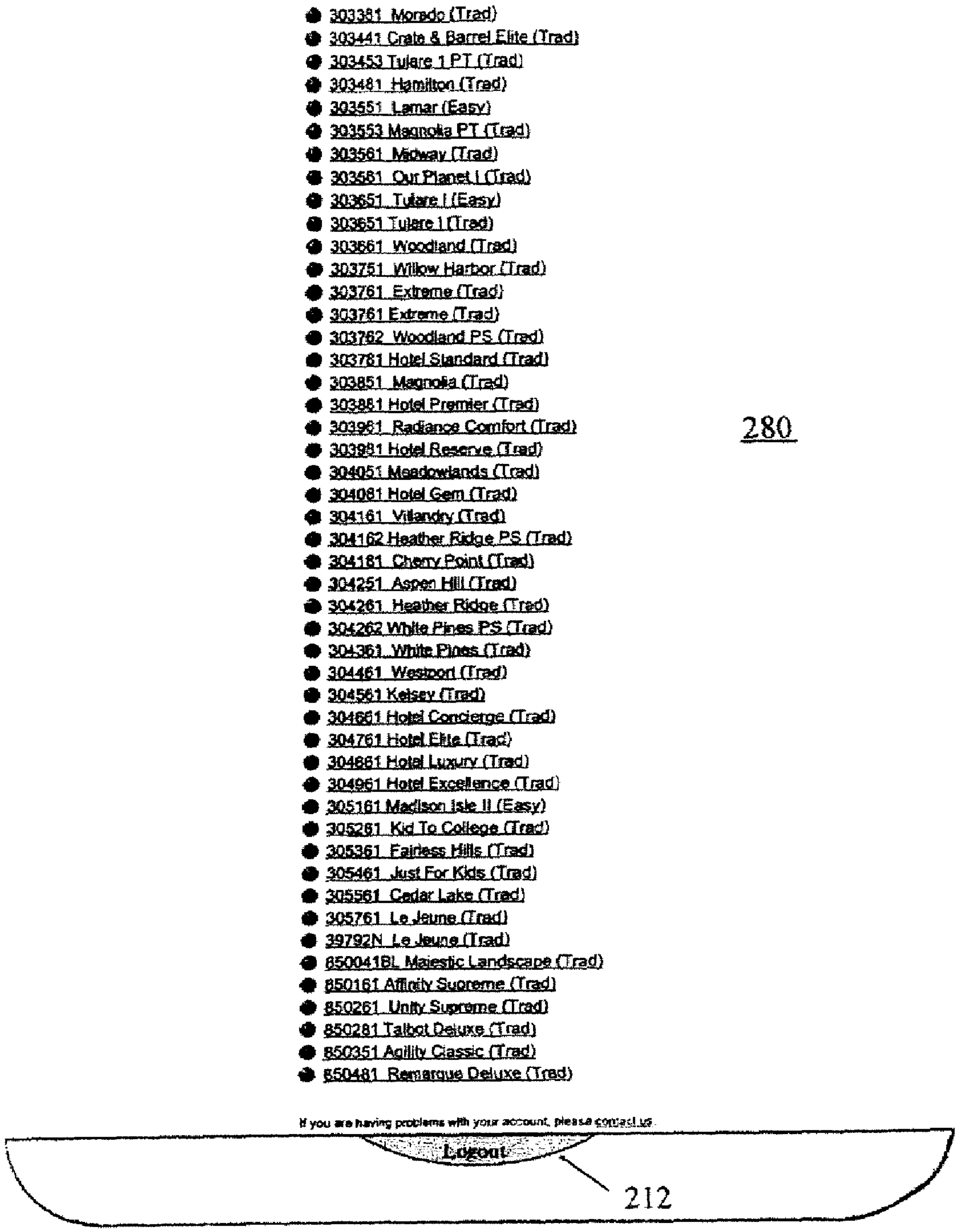
Figure 17:
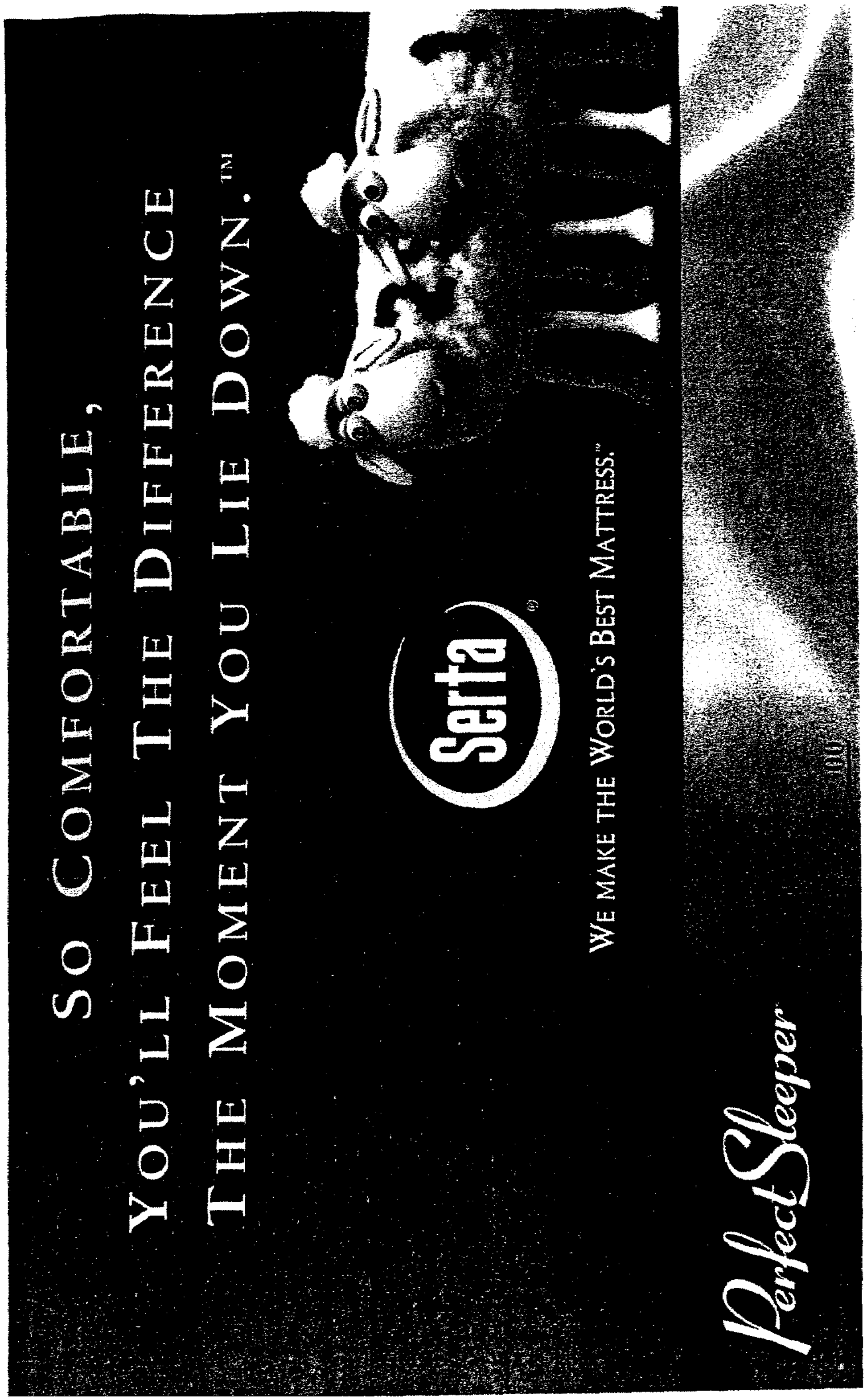
FIG. 17 is a perspective view of an illustrative, but nonlimiting, fabric product label, e.g., mattress label, as also shown in FIG. 8B and having general information that is applicable to a plurality of products but has not been laser jet printed and has no specific product information in accordance with the present invention.
Figure 18:
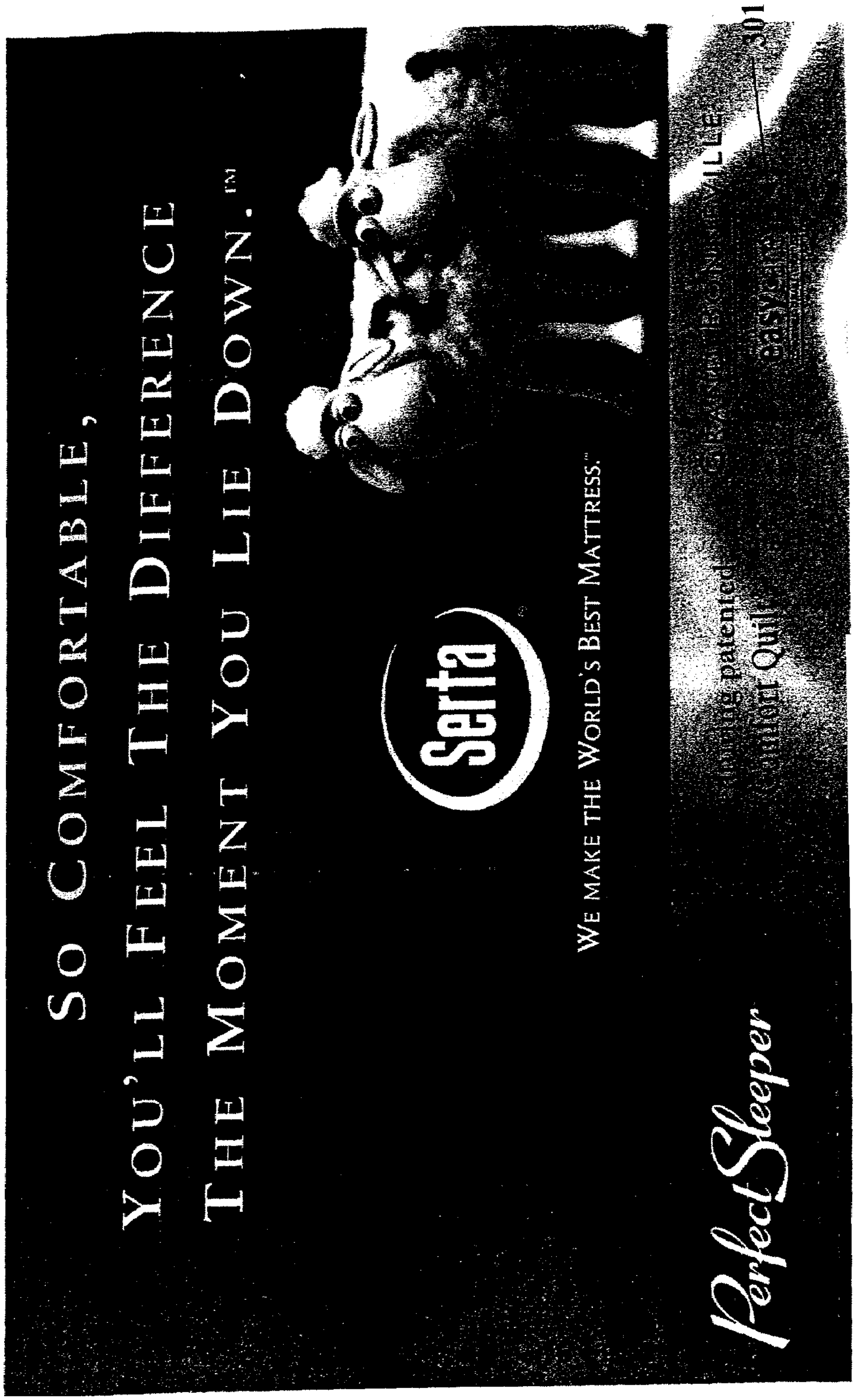
FIG. 18 is a perspective view of an illustrative, but nonlimiting, fabric product label, e.g., mattress label, as shown in FIG. 17 with the addition of specific product information, as shown in FIG. 10, that has been laser jet printed thereon in accordance with the present invention.

For example, the specific product information 278, as shown on FIG. 8B, is also shown on FIG. 17. By clicking on the hyperlink 279, the customer is directed to the graphical user interface screen that is generally indicated by numeral 280 in FIGS. 9, 9A, 9B, 9C and 9D. There are preferably, but not necessarily, numerous links to files that provide specific product information that can be reviewed. One specific link is indicated by numeral 282 in FIG. 9A. Upon clicking this hyperlink, the customer is directed to the specific product information shown in FIG. 10 and indicated by numeral 284. FIG. 18 shows not only the fabric imprint background shown in FIG. 17 but with the addition of this specific product information 301, from FIG. 10, printed thereon to create the finished fabric product label. An illustrative, but nonlimiting example, of a type of electronic filing containing the specific product information is a formatted document file. The preferred type of formatted document file is in a Portable Document Format file, i.e., PDF, file.

Figure 11:
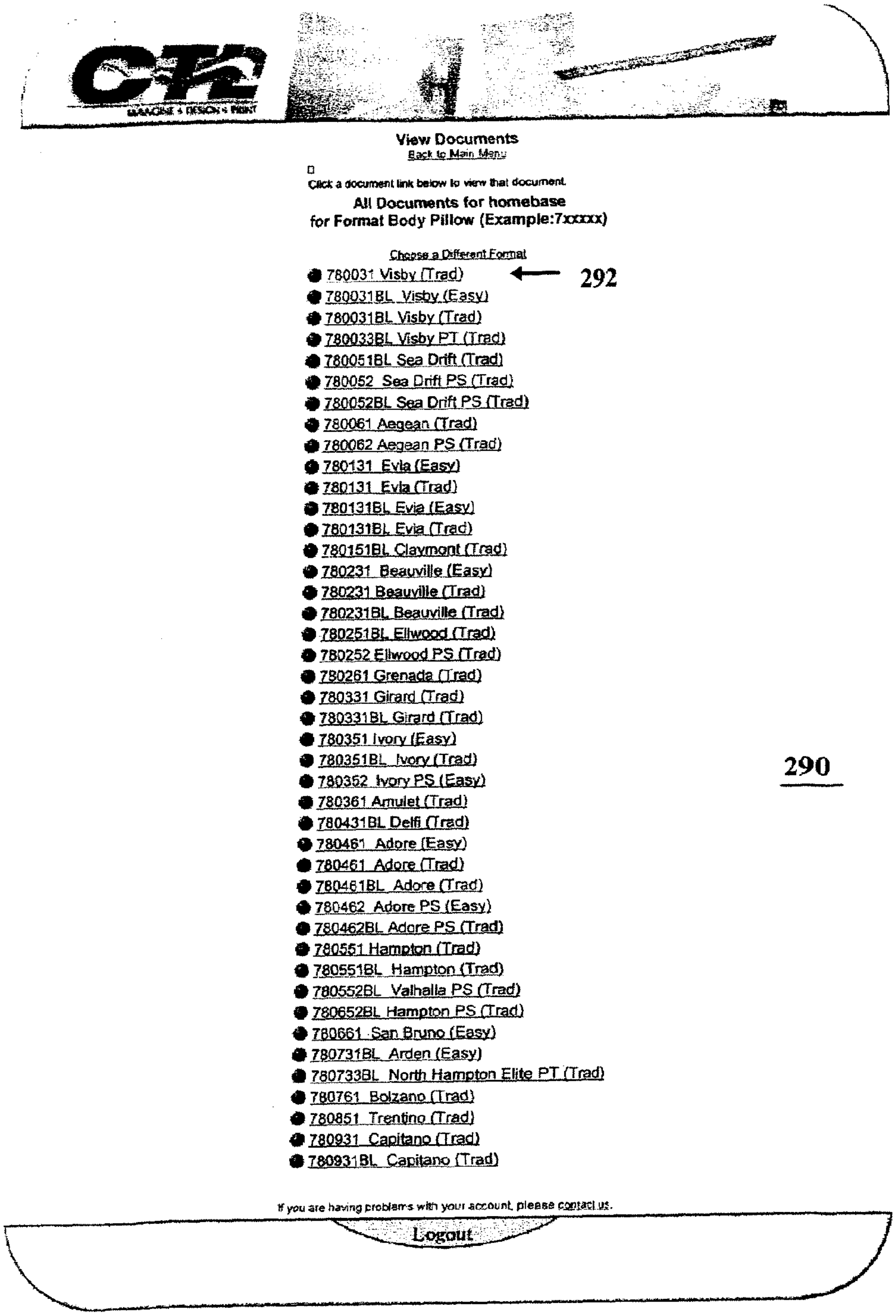
FIG. 11 is an exemplary screen display (graphical user interface) for viewing a second illustrative, but nonlimiting, listing all of the specific product information files available for another particular imprinted fabric product label, shown in FIG. 8, in accordance with the present invention.

Another example is by clicking on the hyperlink 275, as shown in FIG. 8B, the customer is directed to the graphical user interface screen that is generally indicated by numeral 290 in FIG. 11. There are preferably, but not necessarily, numerous links to files that provide specific product information that can be reviewed. One specific link is indicated by numeral 292. Upon clicking this hyperlink, the customer is directed to the specific product information shown in FIG. 12 and indicated by numeral 294.

This process involves the customer picking the correct specific product information that comports with the selected specific product information <124>. The customer then loads the appropriate number of pre-printed fabric labels from inventory into a laser jet printer <126> and prints the desired number of fabric labels with the specific product information <128>. The final step is attaching the fabric label to the product <130>. In the specific example of mattresses, this can include sewing, adhesives, and so forth. In the preferred embodiment, the labels are printed with the general product information at a first location and then laser jet printed at each customer's specific second location with the specific product information with each customer, e.g., subsuppliers, franchisees, and so forth, only having access to specific product information for a selected number of particular products.

Figure 13:
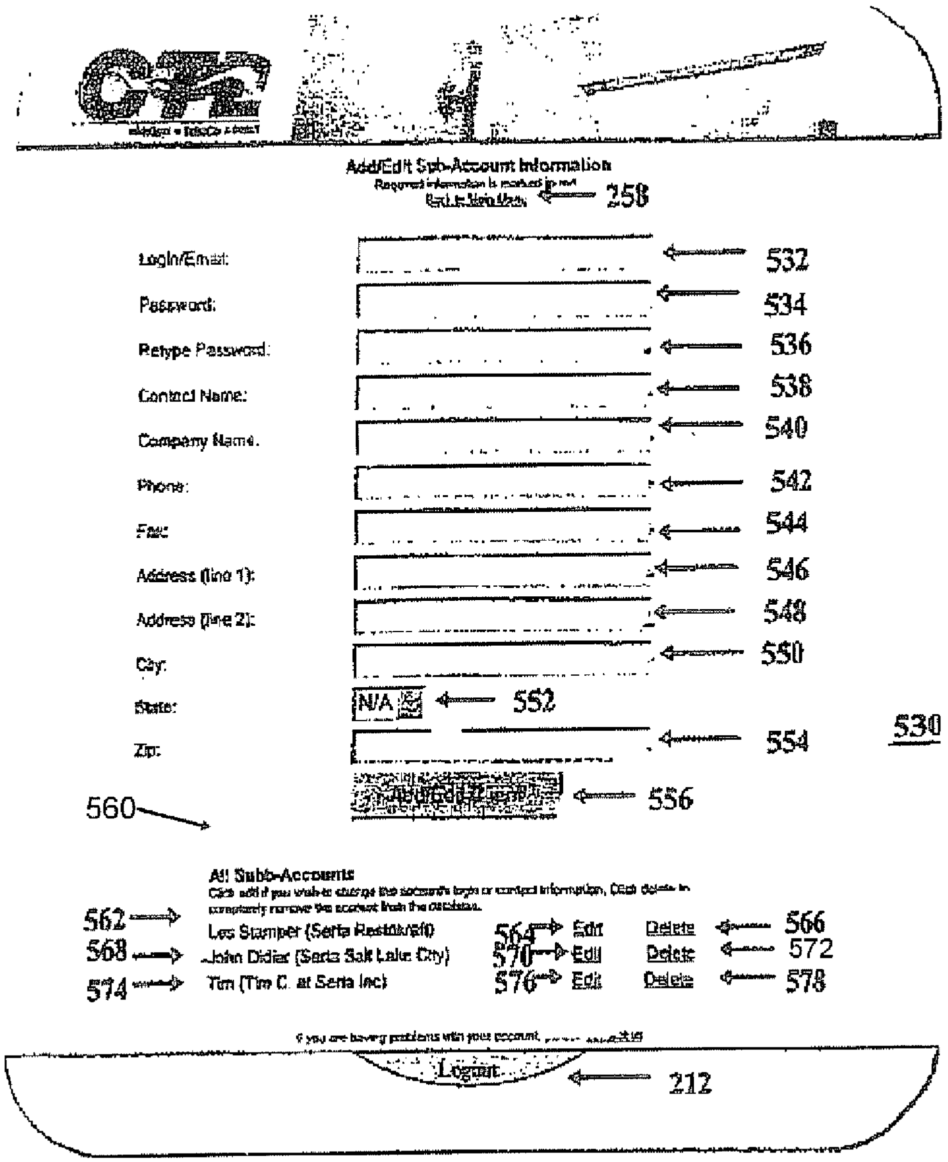
FIG. 13 is an exemplary screen display (graphical user interface) for adding and editing subaccounts which restrict access for each customer, e.g., licensee or franchisee, to particular specific product information files; in accordance with the present invention.

Another aspect of the present invention is the ability to restrict customers, e.g., licensees and franchisees, to specific fabric label imprint backgrounds and limit the specific product information for each fabric label imprint background. Referring back to FIG. 6, the customer can access the function for creating subaccounts indicted by numeral 218. This directs the customer to the graphical user interface screen for adding and editing subaccount information that is generally indicated by numeral 530, as shown in FIG. 13. This includes: an input for a login or email address 532; an input for a password 534; an input for a password verification 536; an input for a contact name 538; an input for the name of an organization 540; an input for a telephone number 542; an input for a facsimile number 544; an input for a first address line 546; an input for a second address line 548; an input for a city 550; a drop-down input for a state 552; and an input for a zip code 554. There is a graphical user pushbutton 556 that allows the customer to add or edit the subaccount information. There is also a listing of all active subaccounts that is generally indicated by numeral 560. Under this listing 560 is a first example of customer 562 with a link to an edit function 564 and a link to delete that first customer's subaccount 566. The customer information is on a graphical user interface screen that is identical to that shown by numeral 530 on FIG. 13 only with information specific to that particular customer. There is also a second and third examples of customers 568 and 574, respectively. The illustrative second and third customers each have their own link to an edit function 570, 576 and link to delete the customer's subaccount 572, 578, respectively. As before, there is a link 258 that allows the customer to return to the home page of FIG. 6.

Figure 14:
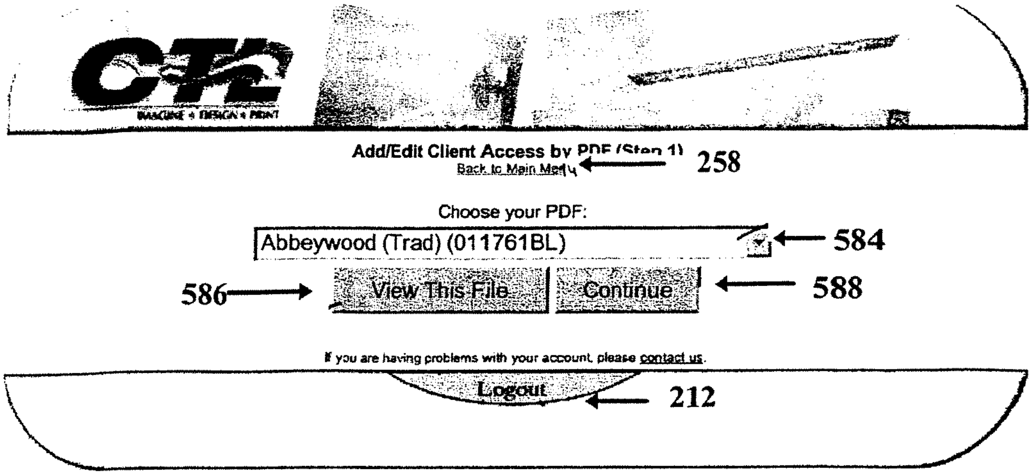
FIG. 14 is the graphical specific product information for viewing specific product information files and directing the user to another exemplary screen display (graphical user interface), i.e., FIG. 15, to ascertain which customers have access to that particular and specific product information file in accordance with the present invention.
Figure 15:
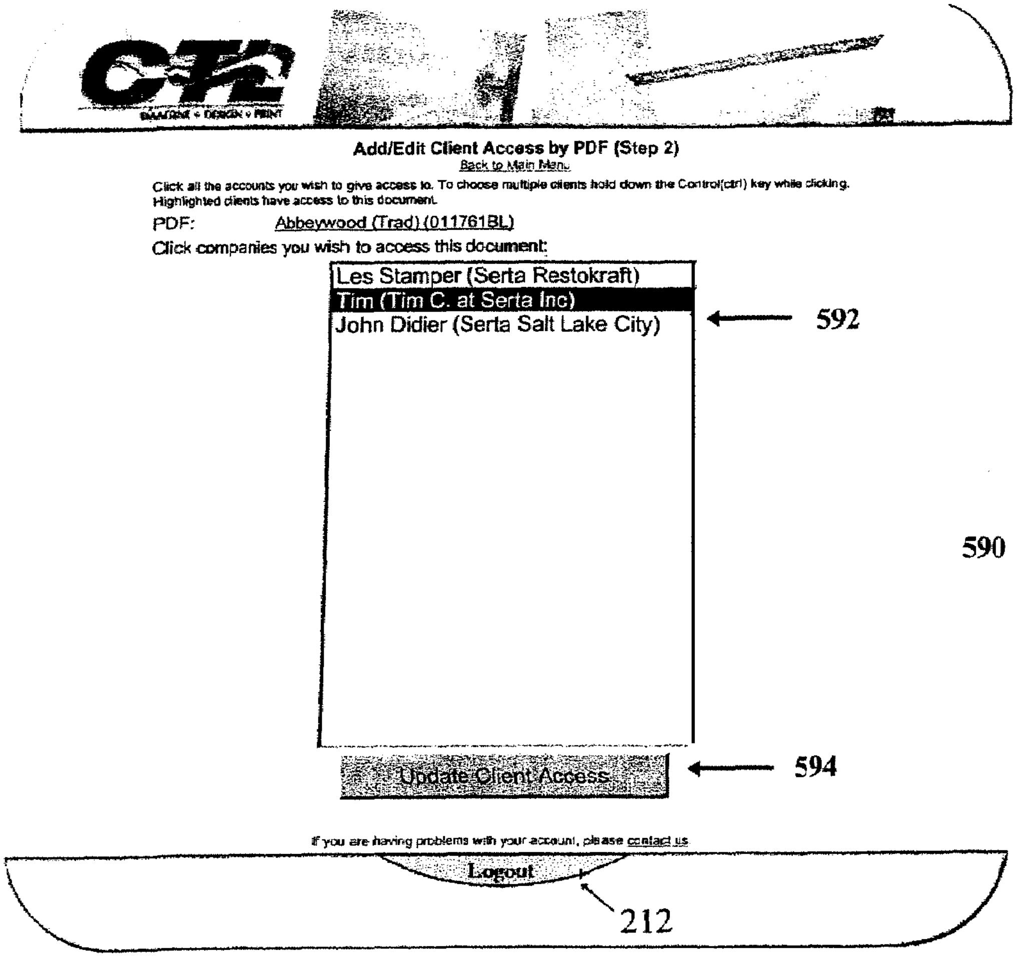
FIG. 15 is another exemplary screen display (graphical user interface) to ascertain which customers have access to particular and specific product information files for laser jet printing of product labels in accordance with the present invention.

Referring again to FIG. 6, there is a function to manage access to the product specific information for each subaccount 220. By accessing this feature, the customer is directed to a graphical user interface screen that is generally indicated by numeral 580 on FIG. 14. There is a drop-down input 584 that lists all of the product specific information in the system. There is a graphical user input pushbutton 586 that allows the customer to view this file and a graphical user input pushbutton 588 that directs the user to a listing of all customers that have access to that specific product information file as indicated by the graphical user interface screen 590 shown on FIG. 15. The listing is indicated by numeral 592 and there is a graphical user interface pushbutton 594 that will update the listing of specific individuals or entities that have access to a specific product information file in the system.

Figure 19:
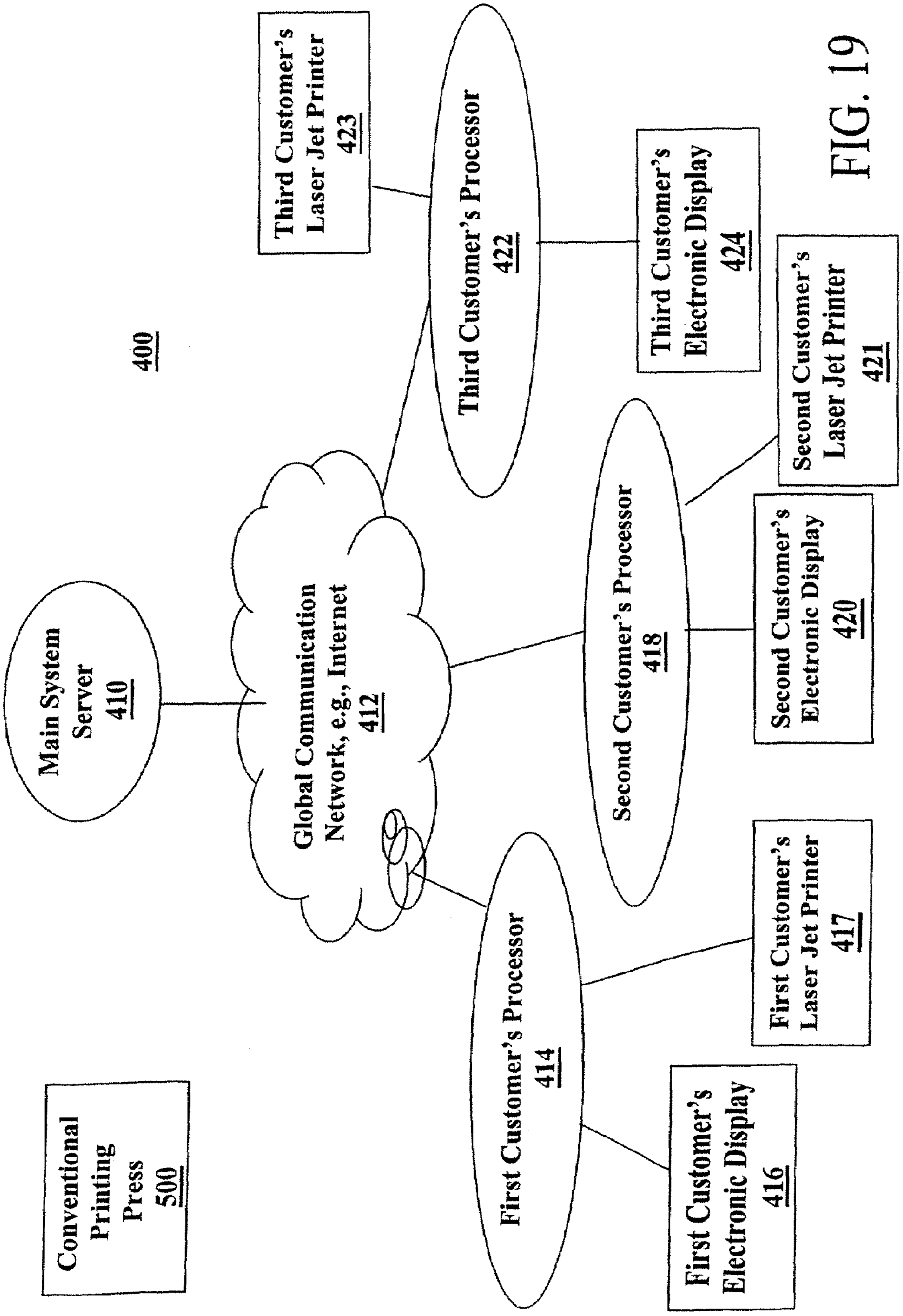
FIG. 19 is a general schematic diagram of the inline labeling system in accordance with the present invention.

Referring now to FIG. 19, the overall electronic inline labeling system is generally indicated by numeral 400. The main system server is generally indicated by numeral 410 and preferably, but not necessarily, stores a first plurality of electronic files with each file having general product information that is applicable to a plurality of products and a second plurality of electronic files with each file directed to specific product information that is directed to a specific product. This main system server 410 can include virtually any type of processor. Access to the main server 410 is through a global computer network, e.g., Internet, 412. There is a first customer's processor 414, second customer's processor 418 and a third customer's processor 422. Although only three customers are illustrated, virtually any number of customers can utilize the system with the only limitation being the computer resources available. Each processor can be a single processor or a whole series of processors. Preferably processors 414, 418 and 422 are each a personal computer, however, a wide variety of electronic computers or electronic controllers will suffice. Each of the processors 414, 418 and 422 are connected to an electronic display 416, 420 and 424, respectively. The preferred electronic display is a liquid crystal display, however, any electronic display will suffice such as plasma, cathode ray tube, and so forth. The electronic displays can display both the general product information that is applicable to a plurality of products and the specific product information directed to a specific product. Each of the processors 414, 418 and 422 are also connected to a laser jet printer 417, 421 and 423, respectively. Virtually all types of laser jet printers will suffice for this application and is only limited by the ability to print on fabric labels. Also, photocopying machines that utilize toner, as previously described, that can receive and print data can also be utilized with the present invention.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

The invention claimed is:

1. A process for creating and printing a label to be attached to or otherwise associated with a product utilizing a computer system comprising:

displaying all fabric labels from a computer database at a first location available to a specific user, said fabric labels each having a top side and a bottom side, at least the top side of the fabric label including general product information that is applicable to a plurality of products and at least a portion of the top side of each fabric label having a laser jet toner receptive coating associated therewith;

each fabric label having a plurality of product specific information available for selecting by a user for that specific fabric label;

selecting a specific fabric label at a first location from said computer database;

displaying all specific product information available for printing onto the selected specific fabric label;

selecting the specific product information that is directed to a single product from the database at the first location that can be utilized with the selected specific fabric label;

controlling access to the specific product information that is directed to a single product from the database so that different users can only create and print product labels for the attachment to or association with a product that has been authorized for each particular user, each user having access to specific product information for a selected number of particular products;

viewing the selected specific product information on the selected specific fabric label prior to printing;

loading the selected fabric label into a laser jet printer, wherein the selected fabric label has been printed by a printing press with the previously selected general product information that is applicable to a plurality of products at a second location; and printing the specific product information that is directed to a single product onto the laser jet toner receptive coating associated with the top side of the fabric label with the laser jet printer at the first location.

2. The process for creating a label for a product utilizing a computer system as set forth in claim 1, wherein the computer database is accessible through a global computer network.

3. The process for creating a label for a product utilizing a computer system as set forth in claim 2, wherein the global computer network includes the Internet.

4. The process for creating a label for a product utilizing a computer system as set forth in claim 1, wherein specific information that is directed to a single product includes an formatted document file.

5. The process for creating a label for a product utilizing a computer system as set forth in claim 4, wherein the formatted document file includes a Portable Document Format file.

6. The process for creating a label for a product utilizing a computer system as set forth in claim 1, wherein each user to the system can provide account information selected from the group consisting of an input for a login, an input for an e-mail address, an input for a password, an input for a password verification, an input for a contact name, an in put for the name of an organization, an input for a telephone number, an input for a facsimile number, an input for a first address line, an input for a second address line, an input for a city, an input for a state and an input for a zip code.

7. The process for creating a label for a product utilizing a computer system as set forth in claim 1, wherein information for each authorized user can be established in a subaccount selected from the group consisting of an input for a login, an input for an e-mail address, an input for a password, an input for a password verification, an input for a contact name, an input for the name of an organization, an input for a telephone number, an input for a facsimile number, an input for a first address line, an input for a second address line, an input for a city, an input for a state and an input for a zip code.

8. The process for creating a label for a product utilizing a computer system as set forth in claim 1, wherein each user can be selectively provided access to formatted document files having the specific product information, wherein each formatted document file is directed to a specific product.

9. A process for creating and printing a fabric label for a mattress to be attached to the mattress utilizing a computer system comprising:

displaying all fabric labels from a computer database at a first location available to a specific user, said fabric labels each having a top side and a bottom side, at least the top side of the fabric label including general product information that is applicable to a plurality of mattress products and at least a portion of the top side of each fabric label having a laser jet toner receptive coating associated therewith;

each fabric label having a plurality of specific mattress information available for selecting by a user for that specific fabric label;

selecting a specific mattress fabric label at a first location from said computer database;

displaying all specific mattress information available for printing onto the selected specific mattress fabric label;

selecting the specific mattress information that is directed to a single mattress from the database at the first location that can be utilized with the selected specific mattress fabric label;

controlling access to the specific mattress information that is directed to a single mattress from the database so that different users can only create and print mattress labels for the attachment to a specific mattress that has been authorized for each particular user, each user having access to specific mattress information for a selected number of particular mattresses;

verifying the selected specific mattress information and viewing the selected specific mattress information on the selected specific mattress fabric label prior to printing;

selecting the correct format of the selected mattress fabric label that correlates with the selected specific mattress information;

loading the selected mattress fabric label into a laser jet printer, wherein the selected mattress fabric label has been printed by a printing press with the previously selected general information that is applicable to a plurality of mattresses at a second location; and printing the specific information that is directed to a single mattress onto the laser jet toner receptive coating associated with the top side of the mattress fabric label with the laser jet printer at the first location.

* * * * *